United States Patent [19]

Smith, Jr.

[11] Patent Number: 4,732,803
[45] Date of Patent: Mar. 22, 1988

[54] LIGHT WEIGHT ARMOR

[76] Inventor: W. Novis Smith, Jr., 412 S. Perth St., Philadelphia, Pa. 19147

[21] Appl. No.: 916,235

[22] Filed: Oct. 7, 1986

[51] Int. Cl.⁴ .......................... B32B 7/02; B32B 5/12; F41H 1/02; F41H 5/04
[52] U.S. Cl. ..................................... 428/212; 428/113; 428/323; 428/911; 2/2.5; 2/6; 2/412; 89/36.02; 89/36.11; 89/36.12; 109/49.5; 109/80; 114/9; 244/121; 296/188
[58] Field of Search ................. 89/36.02, 36.11, 36.12; 2/2.5, 6, 411, 412; 109/49.5, 80; 114/9–14; 244/121; 296/188; 428/113, 212, 302, 323, 911

[56] References Cited

U.S. PATENT DOCUMENTS

| | | | |
|---|---|---|---|
| 2,697,054 | 12/1954 | Dietz et al. | 89/36.02 |
| 3,771,418 | 11/1973 | Gulbierz et al. | 428/911 X |
| 4,186,648 | 2/1980 | Clausen et al. | 2/2.5 X |
| 4,378,395 | 3/1983 | Asoshina et al. | 296/188 X |
| 4,403,012 | 9/1983 | Harpell et al. | 428/911 X |
| 4,468,499 | 8/1984 | Siegfried et al. | 525/196 X |
| 4,574,105 | 3/1986 | Donovan | 428/233 |
| 4,604,319 | 8/1986 | Evans et al. | 428/113 X |

FOREIGN PATENT DOCUMENTS 8403529  6/1986  Netherlands ................ 2/2.5

Primary Examiner—John E. Kittle
Assistant Examiner—Susan S. Rucker
Attorney, Agent, or Firm—Steele, Gould & Fried

[57] ABSTRACT

Light weight armor comprising lamina-like structures arranged with zones of decreasing Young's modulus and increasing elongation characteristics. The structure contains at least one composite having fibers arranged to dissipate impact forces laterally.

25 Claims, 5 Drawing Figures

LIGHT WEIGHT ARMOR

BACKGROUND OF THE INVENTION

1. Field of the Invention

The present invention relates to light weight armor. More particularly, the invention relates to light weight composite armor comprising lamina-like structures arranged with zones of decreasing Young's modulus and increasing elongation characteristics so as to dissipate impact forces laterally as rapidly as possible while providing maximum missile stopping power per given weight and thickness.

2. Prior Art

Light weight composite armor is presently being utilized in military vehicles and helmuts. The armor is being used alone or in combination with surface metal structures.

U.S. Pat. No. 4,186,648 of Clusen et al describes an armor wall structure comprising a plurality of woven fabric laminates of polyester resin fibers arranged and supported in and by a resinous matrix with a filler of particulate metal abrading material, and woven fabric laminates.

U.S. Pat. No. 4,574,105 of Donovan discloses penetration resistant textile panels with plies of nylon and Kevlar.

U.S. Pat. No. 4,468,499 of Seigfried et al, which is herewith incorporated by reference, discloses chemically blended thermoplastic interpenetrating polymer network compositions.

There are many light weight materials which have high strength and elasticity but do not respond well when subjected to impact velocities over 2000 ft/sec. High modulus and high strength materials are usually brittle and crack or notch sensitive. Once damaged, these high modulus and high strength materials lose a great deal of their stoppping power or impact strength due to crack sensitivity.

Elastomer materials are not usually crack or damage sensitive but can be readily penetrated at high impact velocities.

Chopped glass fibers and most other material fillers are known to usually increase the impact resistance of resins with which they are compounded because they act as stress concentrators. However, glass fibers and fillers further tend to embrittle ductile and semiductile polymers. Addition of plasticizers and energy-absorbing constituents such as rubbers, tend to overcome the embrittlement sensitivity or crack propagation but decrease the energy dissipation away from the lateral direction and decreases penetration resistance per unit area.

Use of carbon fiber composites alone have been ineffective in providing enhanced stopping ability without an increase in mass or thickness when compared to glass fibers or aramid fiber.

SUMMARY OF THE INVENTION

The present invention relates to novel light weight armor and to reinforcement structures for parts subjected to high impact forces. More particularly, the invention is concerned with light weight composite armor comprising one or more lamina-like structures forming zones of resinous materials arranged in order of decreasing Young's modulus and increasing elongation at break charcteristics. Under such an arrangement it is possible to dissipate impact forces laterally as rapidly as possible while providing maximum missile stopping power per given weight and thickness.

The zones of resinous material are either formed as an integral resinous body or may comprise one or more separate layers bonded or joined together. At least one of the zones contains a fiber layer. The fibers are oriented so as to transfer impact nergy laterally. Advantageously, the fibers are woven. It is critical in the invention that the fibers and the resin be selected so that they stretch and break together. Therefore, the resin matrix for the zone or zones must have substantially the same or slightly higher elongation aty break as the fibers incorporated therein.

When the fibers are non-woven filaments, the amount and alignment of the fibers are such as to liminate voids and to rapidly dissipate impact energy laterally such as in a compression molded sheet.

The armor structure advantageously has an outer sacrificial layer which is used to slow down the velocity of a missile to a degree whereby the adjacent high strength lower modulus material can respond to give deflection. Preferably, the outer initial impact layer is metallic, a ceramic carbide or glass fiber composite or even a continuous sheet material. However, this sheet must have a high stiffness or resistance to deflection.

The different regions may be fabricated separately and then bonded together or they may be formed integrally in a single mold, such as by layering. Another method of fabricating integral regions is through the use of chemically blended thermoplastic interpenetrating polymer network compositions as disclosed in U.S. Pat. No. 4,468,499. One or more regions may contain a fiber which has a compatible elongation. Preferred fibers include aramid (Kevlar 29 and 49), carbon, fiberglass (S-2 glass), spectra, nylon, and the like. The fibers are preferably woven. If non-woven fibrs are used, then they are preferably at least 1 inch in length so that they will respond as if they are continous under impact situations. The use of compression molding or resin transfer fabrication techniques with chopped or non-woven fibers greatly reduces the costs of manufacture with little decrease in impact resistance.

It is therefore, an object of the invention to provide light weight armor having improved missil stopping power per given weight and thickness.

It is a further object of the invention to provide armor which can deflect significant impact blows without undue stress concentration.

It is a still further object of the invention to provide materials having damping or internal energy-absorption without an increase in mass of volume for use in cooperation with structures subject to impact.

It is a yet still further object of the invention to provide a light weight military helmut that has greater penetration resistance and is more economical to manufactur through compression molding to provide accoustical panels of high effectiveness.

It is a yet another object of the invention to provide a reinforcement for military vehicle bodies, hlicopters and for boat hulls which does not add a large amount of weight or bulk.

Other objects and a fuller understanding of the invention will be has by referring to the following description and claims of a preferred embodiment, taken in conjuction with the accompanying drawings, wherein like reference characters refer to similar parts throughout the several views.

DESCRIPTION OF THE PREFERRED EMBODIMENT OF THE INVNETION

Figure 1:
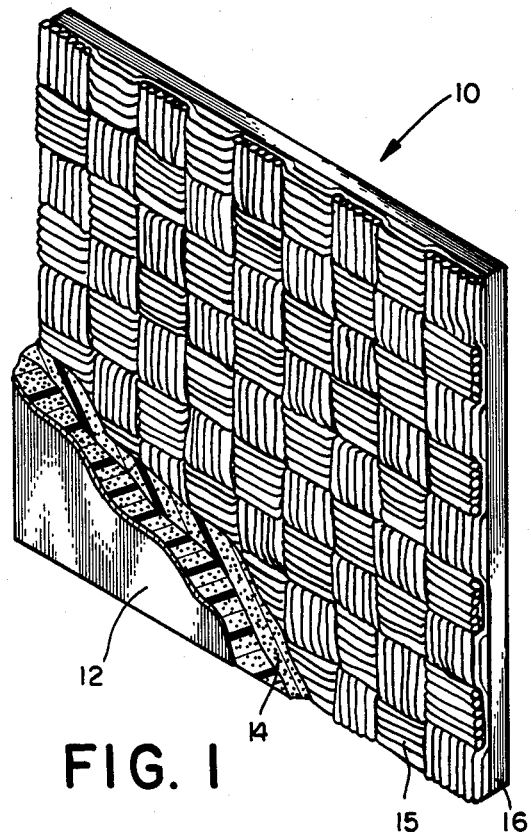
FIG. 1 is an elevational view, partly in section disclosing an armor laminate of the invention.

Although specific terms are used in the following description for the sake of clarity, thes terms are intended to refer only to the particular structure of the invention selected for illustration in the drawings, and are not intended to define or limit the scope of thee invnetion.

Referring now to the drawings, as seen in FIG. 1, a light weight armor structure 10 is shown which has been bonded to an outer metallic surface 12, for example, the body of a motor vehicle which forms the first impact zone. Adjacent zone or surfac 12 is a resin 14 of a lower Young's modulus than the metal 12. The resin 14 may comprise a high strenght high modulus resin such as ethylene-acrylate or methacrylate copolymers, vinyl ester phenolic, bismaleimide, polyimide, high strength mdium modulus thermoplastics such as in ionomer (i.e. crosslinked ethylene-acrylate or methacrylate copolymers), poly carbonate, nylon, aramid or the like. Suitable fillers may be added to increase their impact resistance.

The next zone or layer comprises a composite 15 which is comprised of a woven fiber in a resinous matrix. The composite 15 has a lower Young's modulus than the resin 14 and a greater elongation at break. The fiber is selected so as to have about the same elongation or slightly less elongation at break as the resin matrix. The resinous matrix may be the same or different from the resin 14. The addition of the fibers are usually sufficient to modify the modulus and elongation characteristics of the resin. suitable fibers include fiberglass, carbon, aramid (i.e. Kevlar 29 and Kevlar 49), semi-crystalline polyolefin (i.e. semi-crystalline polystyrene and polyethylene), and the like.

The fibers which are utilized in the composite 15 may comprise hybrids, for example, aramid and carbon; aramid and glass; aramid, arbon and glass; carbon, glass and Spectra, tc. Hybridization of the fibers not only reduces costs but in many instances improves the performance in armor atructures. It is known that aramid fiber and carbon are significantly lighter than glass fiber. The specific modulus of elasticity of aramid is nearly twice that of glass, while a typical high-tensile-strength grade of carbon fiber ismore than three times as stiff as glass in a composite. However, aramid fiber has alower compressive strenght than either carbon or glass, while carbon is not as impact resistant as aramid. Therefore, a hybrid of the two materials results in a composite that is (1) lighter than a comparable glass fiber-reinforced plastic; (2) higher in modulus, compressive strength, and flexural strength than an all-aramid composite; and (3) higher in impact resistance and fracture toughness than all-carbon composite.

The next zone or layer 16 is a resin having a lower Young's modulus and greater elongation than the adjacent zone 15. The resin may be similar to the resinous matrix of composite 15 which has been suitably modified with fillers. The fillers may be spheres, flakes, fibrs, powder or a mixture thereof. The fillers may be carbon, glass, mica, talc, plastic materials, etc. Spheres have been found to provide a unique function in their use in armor. Spheres, unlike fiber with its directional strength, provide an isotropic effect. The stresses around the sphere are even and predictable and distribute stress evenly thorughout a molded structure. Lightweight polyvinylidene choride hollow spheres are extremely flexible for good distribution of impact energy for use in the invnetion.

In the arrangement illustrated in FIG. 1, the outer metallic zone is used as a sacrificial layer to slow down th velocity of a projectile (i.e. bullet, shell fragments) so that the high strength lower modulus material can respond and provide deflection. The projectile then dissipates the impact energy in the third zone with the fiber reinforcement. The entire composite and not only the fibers provide the stopping or slowing of the projectile because of the combined elongation under load with the rapid lateral transfer of energy. The further dampening of the energy and stopping of the missile occurs in the final zone.

Figure 2:
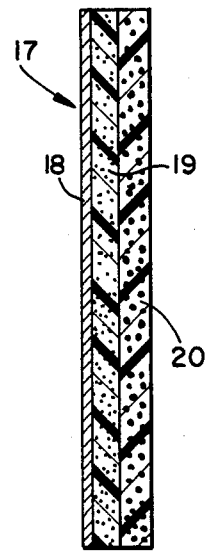
FIG. 2 is a side sectional view of another form of armor laminate of the invention.

As shown in FIG. 2, there may be formed an armor structure 17 wherein a sacrificial surface metaal 18 is the outer zone and a composite 19 comprising a resin matrix and woven fibers forming the adjacent zone. The further interior zone 20 can be a resin having a suitable filler such as carbon fibers or plastic sphers. The structure 17 may be fabricated by layering the different composites prior to final curing or by bonding with a suitable adhesive, such as an epoxy resin. The arrangement shown in FIG. 2 is suitable for the fabrication of hulls for marine vessels. The arrangement can also be used for automobile bumpers.

Figure 3:
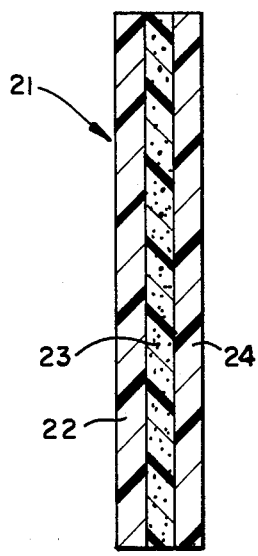
FIG. 3 is a side sectional view of a further embodiment of the invention.

FIG. 3 illustrates an armor structure 21 wherein the outermost and innermost surfaces are resinous materials which have bonded therebetween a composite having fibers arranged in a single plane to laterally dissipate impact energy. Advantageously, the outer layer 22 is a high strength thermosetting resin such as epoxy and the middle layer 23 comprises an ionomer matrix containing carbon fibers or S-2 glass fibers. The innermost layer 24 is a resin such as a fiber reinforced polyurethane. The arrangement would b suitable for use in fabricating military helmuts.

The ionomer which is utilized for the helmuts is preferably a crosslinked ethylene-acrylate or methacrylate such as Surlyn, an ionomer resin sold by E.I. Du Pont de Nemours and Co., Wilmington, Del.

Figure 4:
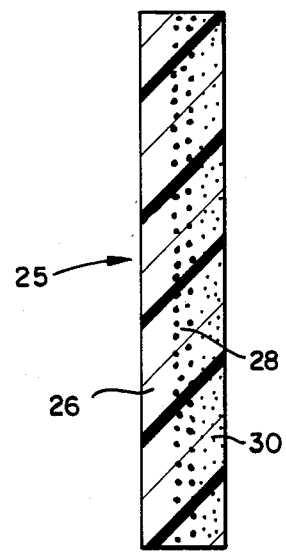
FIG. 4 is a side sectional view of an armor composite of the invention.

FIG. 4 shows an armor composite 25 which is a thermoplastic interpenetrating polymers network composition that is prepared according to the procedure disclosed in U.S. Pat. No. 4,468,499. As seen, the outer zone 26 is free of fibers, although it can be reinforced, and will be of a higher modulus than a corresponding resin that does not have an interpenetrating network. Zone 26 may be a poly (diphenyl siloxane), nylon, poly (butylene terephthalate), polytetrahydrofuran, etc. or other thermoplastic resin.

The central zone 28 may be an ionomer block containing carbon fibers. The innermost layer 30 may be an eleastomeric block ahving Kevlar fibers. The elastomeric block can be a diene such as polybutadiene, polyisoprene, or their copolymers. Such an arrangement can be used in forming a flexible body armor.

Figure 5:
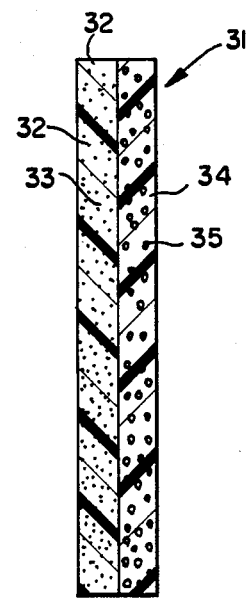
FIG. 5 is a side sectional view of an armor support laminate.

In FIG. 5, there is illustrated an armor laminate 31 which can be use dalone or in connection with other armor structures provided the total armor is arranged so that each zone is in order of decreasing Young's modulus and increasing in elongation characteristics in accordance with the invention. As seen, zone 32 is a composite of carbon or glass fibers 33 in a resinous matrix. Zone 35 comprises a composite of fibers or spheres 37 in a resinous matrix 34. If a similar resin matrix is utilized, the laminate 31 can be prepared in the same mold by the technique of forming layers without the need for a separate intermediate adhesive.

Thus, according to the present invnetion, the maximum stopping power per given weight and thickness is achieved when the impact force of a missile or projectile is spread laterally as quickly as possible. The faster and more effectively this is performed, the less the force per unit area that each successive zone or layer is ubjected. By the present arrnagement the maximum force is converted into deflection and dampening to zero rather than damage or penetration through all of the layers of the armor structure.

Although the invention has been described with a certain degree of particularlty, it is understood that the present disclosure has been made only by way of exampl and that numerous changes in the details of contruction and the combination and arrangement of parts may be resorted to without departing from the spirit and scop of the invention.

What is claimed is:

1. An armor structure comprising a plurality of zones of resinous materials, said zones being arranged in decreasing Young's modulus and increasing elongation characteristics, at least one of said zones comprising a resin matrix having fibers incorporated therein; said resin matrix having the same or higher elongation at break as the fibers incorporated therein, and said fibers being oriented to transfer impact energy laterally.

2. The armor structure of claim 1 wherein said zones comprise a thermoplastic interpenetrating polymer network compoosition.

3. The armor structure of claim 1 wherein each zone comprise a different resin matrix.

4. The armor structure of claim 1 wherein two zones have fibers incorporated therein.

5. The armor structure of claim 1 wherein the fibers are carbon fibers.

6. The armor structure of claim 1 whrein the fibers are aramid fibers.

7. The armor structure of claim 1 wherein the fibers are glass fibers.

8. The armor structure of claim 1 wherein one zone comprises aramid fibers and another zone comprises carbon fibers.

9. The armor structure of claim 1 wherein the fibers are selected from the group consisting of aramid, carbon, linear cystrallized polyolefin and glass fibers.

10. The armor structure of claim 1 wherein one zone is free of fibers.

11. The armor structure of claim 1 wherein a plurality of laminae are spearately formed and adhesively bondd together to form said zones.

12. The armor structure of claim 11 wherein the outer lamina comprises a high strength thermoset resin matrix.

13. The armor structur of claim 12 wherein said at least one lamina comprises a composite containaer fibers oriented to tansfer impact energy laterally.

14. The armor structure of claim 12 wherein said lamina comprises a resin matrix having a slightly higher elongation at break as the fibers incorporated therein.

15. The armor structure of claim 14 wherein said fibers are woven.

16. The armor structure of claim 1 wherein at least two zones comprise chemically blended thermoplastic interpenetrating polymer network compositions.

17. The armor sturcture of claim 17 wherein at least one zone contains fibers arranged in a manner and direction to transfer impact forces laterally.

18. The armor structure of claim 25 wherein said fibers are selectd from the group consisting aramid, carbon, linear crystallized polyolefins and glass fibers.

19. The armor structure of claim 1 wherein at least one zone contains fillers which are spherical.

20. The armor structure of claim 1 which is a helmut.

21. The armor structure of claim 1 which is a boat hull.

22. The armor structure of claim 1 which is a military vehicle.

23. The armor structure of claim 1 which is a helicopter.

24. An armor structure comprising a thermoplastic interpenetrating polymer network composition having a plurality of polymer zones arranged in decreasing Young's modulus and increasing elongation characteristics, at least one of said zones having fibers incorporated therein, said fibers being oriented to transfer impact energy laterally, said fibers having the same or higher elongation at break as the polymer in which said fibers are incorporated.

25. An armor structure comprising a plurality of lamina sturctures of resinous materials arranged in order of decreasing Young's modulus and increasing in break characteristics at least one of said lamina having fibers incorporated therein which are oriented to transfer impact energy laterally, said resinous materials having substantially the same or higher elongation at break as the fibers incorporated therein.

* * * * *

UNITED STATES PATENT AND TRADEMARK OFFICE
CERTIFICATE OF CORRECTION

PATENT NO. : 4,732,803
DATED : March 22, 1988
INVENTOR(S) : W. Novis Smith, Jr.

It is certified that error appears in the above-identified patent and that said Letters Patent is hereby corrected as shown below:

Col. 2, line 12, "aty" should be --at--.

Col. 2, line 15, "liminate" should be --eliminate--.

Col. 2, line 37, "fibrs" should be --fibers.

Col. 2, line 45, "missil" should be --missile--.

Col. 2, line 60, "hlicpoters" should be --helicopters--.

Col. 2, line 64, "has" should be --had--.

Col. 3, line 15, "INVNETION" should be --INVENTION--.

Col. 3, line 17, "thes" should be --these--.

Col. 3, line 21, "invnetion" should be --invention--.

Col. 3, line 26, "surfac" should be --surface--.

UNITED STATES PATENT AND TRADEMARK OFFICE
CERTIFICATE OF CORRECTION

PATENT NO. : 4,732,803
DATED : March 22, 1988
INVENTOR(S) : W. Novis Smith, Jr.

It is certified that error appears in the above-identified patent and that said Letters Patent is hereby corrected as shown below:

Col. 3, line 28, "strenght" should be --strength--.

Col. 3, line 31, "mdium" should be --medium--.

Col. 3, line 51, "arbon" should be --carbon--.

Col. 3, line 52, "tc." should be --etc.--.

Col. 3, line 54, "atructures" should be --structures--.

Col. 3, line 56, after "is" delete "-".

Col. 3, line 58, "ismore" should be --is more--.

Col. 3, line 60, "alower" should be --a lower--.

Col. 3, line 60, "strenght" should be --strength--.

Col. 4, line 5, "fibrs" should be --fibers--.

UNITED STATES PATENT AND TRADEMARK OFFICE
CERTIFICATE OF CORRECTION

PATENT NO. : 4,732,803

DATED : March 22, 1988

INVENTOR(S) : W. Novis Smith, Jr.

It is certified that error appears in the above-identified patent and that said Letters Patent is hereby corrected as shown below:

Col. 4, line 12, "thorughout" should be --throughout--.

Col. 4, line 15, "invnetion" should be --invention--.

Col. 4, line 18, "th" should be --the--.

Col. 4, line 29, "metaal" should be --metal--.

Col. 4, line 33, "sphers" should be --spheres--.

Col. 4, line 49, "b" should be --be--.

Col. 4, line 56, "polymers" should be --polymer--.

Col. 4, line 67, "ahving" should be --having--.

Col. 5, line 4, "dalone" should be --alone--.

UNITED STATES PATENT AND TRADEMARK OFFICE
CERTIFICATE OF CORRECTION

PATENT NO. : 4,732,803

DATED : March 22, 1988

INVENTOR(S) : W. Novis Smith, Jr.

It is certified that error appears in the above-identified patent and that said Letters Patent is hereby corrected as shown below:

Col. 5, line 15, "invnetion" should be --invention--.

Col. 5, line 21, "ubjected" should be --subjected--.

Col. 5, line 22, "arrnagement" should be --arrangement--.

Col. 5, line 29, "exampl" should be --example--.

Col. 5, line 33, "scop" should be --scope--.

Col. 5, Claim 2, line 47, "compoosition" should be --composition--.

Col. 5, Claim 6, line 54, "whrein" should be --wherein--.

Col. 6, Claim 11, line 10, "spearately" should be --separately--.

Col. 6, Claim 11, line 10, "bondd" should be --bonded--.

UNITED STATES PATENT AND TRADEMARK OFFICE
CERTIFICATE OF CORRECTION

PATENT NO. : 4,732,803

DATED : March 22, 1988

INVENTOR(S) : W. Novis Smith, Jr.

It is certified that error appears in the above-identified patent and that said Letters Patent is hereby corrected as shown below:

Col. 6, Claim 13, line 15, "structur" should be --structure--.

Col. 6, Claim 13, line 16, "containaer" should be --containing--.

Col. 6, Claim 13, line 17, "tansfer" should be --transfer--.

Col. 6, Claim 18, line 30, "selectd" should be --selected--.

Col. 6, Claim 25, line 51, "sturctures" should be --structures--.

Signed and Sealed this

Sixth Day of September, 1988

Attest:

DONALD J. QUIGG

*Attesting Officer*  *Commissioner of Patents and Trademarks*